(12) United States Patent
Aciego et al.

(10) Patent No.: US 9,556,036 B2
(45) Date of Patent: Jan. 31, 2017

(54) DEVICE FOR SEPARATING BORON FROM CARBONATE

(71) Applicants: Sarah M. Aciego, Ann Arbor, MI (US); Bryan K. Sell, Mechanicsburg, PA (US)

(72) Inventors: Sarah M. Aciego, Ann Arbor, MI (US); Bryan K. Sell, Mechanicsburg, PA (US)

(73) Assignee: The Regents Of The University Of Michigan, Ann Arbor, MI (US)

( * ) Notice: Subject to any disclaimer, the term of this patent is extended or adjusted under 35 U.S.C. 154(b) by 76 days.

(21) Appl. No.: 14/636,241

(22) Filed: Mar. 3, 2015

(65) Prior Publication Data

US 2015/0246820 A1    Sep. 3, 2015

Related U.S. Application Data

(60) Provisional application No. 61/946,929, filed on Mar. 3, 2014.

(51) Int. Cl.
| | | |
|---|---|---|
| *B01D 7/02* | (2006.01) | |
| *C01B 35/02* | (2006.01) | |
| *B01D 7/00* | (2006.01) | |
| *B01L 7/00* | (2006.01) | |

(52) U.S. Cl.
CPC .............. *C01B 35/023* (2013.01); *B01D 7/00* (2013.01); *B01L 7/00* (2013.01)

(58) Field of Classification Search
CPC .............. B01D 7/00; B01D 7/02; C01B 17/10
USPC ....................................... 23/294 R
See application file for complete search history.

(56) References Cited

U.S. PATENT DOCUMENTS 5,814,224 A * 9/1998 Khamizov ............... B01J 39/02
                                                      210/638

\* cited by examiner

*Primary Examiner* — Edward Johnson
(74) *Attorney, Agent, or Firm* — Harness, Dickey & Pierce, PLC

(57) ABSTRACT

A device and method for separating boron from carbonate are provided. The device in some embodiments, includes a first half having a heating section, a second half having a cooling section and a plurality of vials disposed therebetween. The second half is opposite the first half. The plurality of vials are adapted to receive boron and an alkaline matrix such that, during heating of the first half and cooling of the second half, boron is sublimated and condensed on a closed end of each of the plurality of vials.

17 Claims, 4 Drawing Sheets

DEVICE FOR SEPARATING BORON FROM CARBONATE

FIELD

The present disclosure relates to a device for separating boron from carbonate.

BACKGROUND AND SUMMARY

This section provides background information related to the present disclosure which is not necessarily prior art. This section provides a general summary of the disclosure, and is not a comprehensive disclosure of its full scope or all of its features.

This device applies the microsublimation technique to achieve highly precise and accurate boron isotopic analysis for small samples (boron<1 ng). We have developed a microsublimation method to process more samples (up to 20 per hotplate) with excellent reproducibility.

The microsublimation technique for boron purification is based on the tendency of boron to sublimate at a temperature and pressure that alkaline matrices and organic matter remain in solution or solid form. The technique design utilized uses a 5 mL conic bottom Savillex PFA vial. The vial is set upside-down so that the cap can be heated, causing the boron to sublimate and then condense onto a cooler surface at the conical point in the bottom of the vial. In previous experiments, the flat bottom, the cap of the vial, was heated to 60-65° C. for 12 hours with aluminum foil wrapped on the lower part of the savillex. The drawback of this design results from the difficulty of controlling and maintaining stable and consistent heating and cooling conditions. Non-reproducible heating and cooling conditions may result in variable sample recoveries. An additional fan for cooling still leads to inconsistent heating conditions between different vials, especially at the conical top of the vials. Therefore, we designed and fabricated water-cooled microsublimation block sets to ensure that all samples are exposed to the same thermal conditions.

Machined heating and cooling blocks are coated in a thermoplastic. The bottom heating blocks were machined to precisely fit the tops of the 5 mL conic beakers. Water from the in-house deionized chilled water system flows through the upper part of cooling coil block through machined channels connected by polyvinyl chloride (PVC) tubing. The cooling coil block rests on threaded chlorinated polyvinyl chloride (CPVC), such that no vibration from water flow disturbs the drops. In addition to supporting cooling block, the low thermal conductivity CPVC prevents heat transfer to the upper cooling block, is corrosion resistant, and can withstand temperatures up to 90° C. The coated stainless steel design of our heating blocks provides a uniform heating and cooling surfaces for the sublimation, which facilitates complete boron evaporation. In order to process large numbers of samples, we designed the heating and cooling blocks to process 10 separate samples at a time and up to 20 per hotplate.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 5:
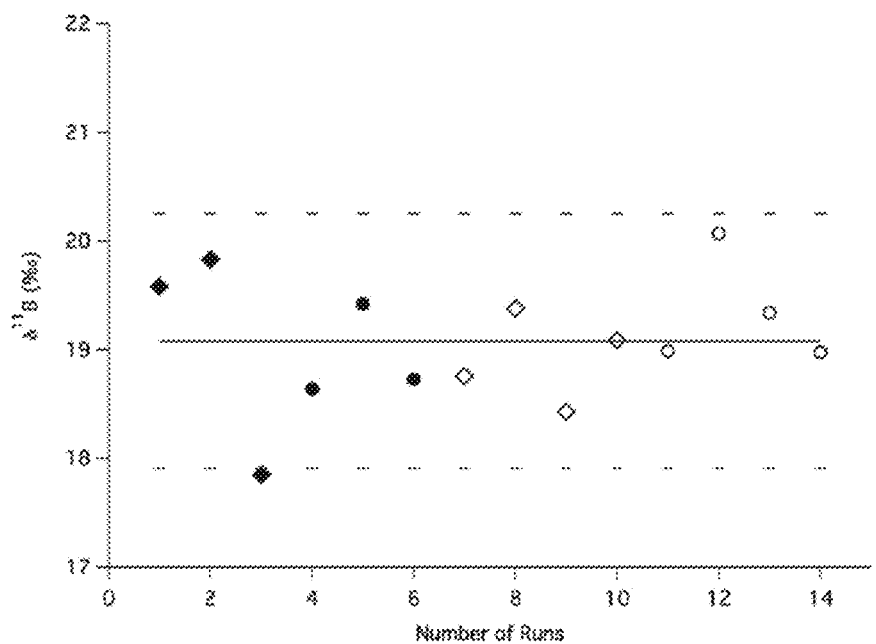
Figure 6:
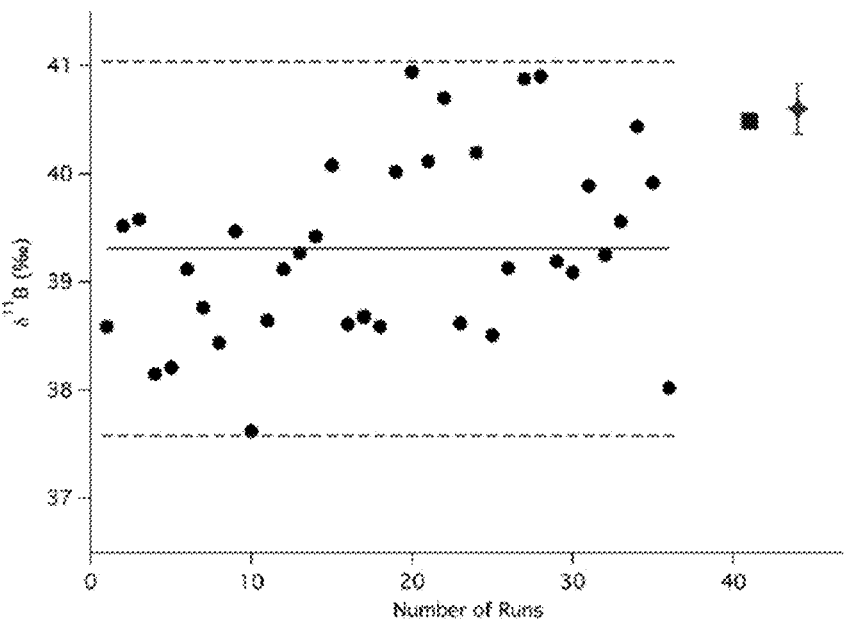

FIG. 5 shows $\delta^{11}B$ values of in-house aragonite carbonate standard UM-CP1, wherein solid diamonds and solid circles represent samples with a 12 hour sublimation time and open diamonds and open circles represent samples with a 20 hour sublimation time, wherein diamonds represent samples with $H_2O_2$ treatment, and wherein solid horizontal lines represent mean values for different data sets with two standard deviations shown in dashed horizontal lines; and FIG. 6 shows $\delta^{11}B$ values of seawater (circles) from a culture experiment from the Damariscotta River (Gulf of Maine), wherein solid horizontal lines represent mean values for different data sets with two standard deviations shown in dashed horizontal lines, and wherein $\delta^{11}B$ results from Jonesport (Gulf of Maine) seawater (square), and IAEA B-1, with 2 SE from FIG. 3B (star) are plotted for comparison.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters.

As referred to herein, ranges are, unless specified otherwise, inclusive of endpoints and include disclosure of all distinct values and further divided ranges within the entire range. Thus, for example, a range of "from A to B" or "from about A to about B" is inclusive of A and of B. Disclosure of values and ranges of values for specific parameters (such as temperatures, molecular weights, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9

INTRODUCTION

Boron has two naturally occurring stable isotopes, $^{10}B$ (19.82%) and $^{11}B$ (80.18%). The distribution of these two isotopes ($\delta^{11}B$, defined as $$\delta^{11}B = \left[ \frac{\left(\frac{^{11}B}{^{10}B}\right)_{sample}}{\left(\frac{^{11}B}{^{10}B}\right)_{SRM951a}} - 1 \right] \times 1000(‰))$$

in various geological samples can be used to explore natural processes such as the extent of water-rock/soil interactions or weathering processes, airborne anthropogenic emissions, clay mineral formation in soils at the soil-water-plant scale, fluid transfer across tectonic subduction zones, and seawater pH variations.

One of the most widely applied applications of boron isotopes to climate and aqueous chemistry is determining the historical record of pH in seawater. Because direct measurements of seawater pH are sparse prior to 1980, the actual influence of the anthropogenic rise in atmospheric $CO_2$ on the pH of seawater is still largely undetermined. Reliable proxies of seawater pH during the Industrial Revolution and from recent millennia and into deep geologic time are few, but the $\delta^{11}B$ values derived from biogenic carbonates (e.g., corals, brachiopods, and foraminifera) have provided important constraints on ancient pH levels.

The dominant aqueous species of boron in seawater are $B(OH)_3$ and $B(OH)_4^-$. The relative proportion of these two species in seawater is a function of pH and can be described as:

$$B(OH)_3 + H_2O \rightleftharpoons B(OH)_4^- + H^+ \quad (I)$$

At low pH, boron exists as $B(OH)_3$ in solution, and conversely, at high pH, boron exists as the species $B(OH)_4^-$. The governing reaction for isotope exchange between these two species is:

$$^{10}B(OH)_3 + {}^{11}B(OH)_4^- \rightleftharpoons {}^{11}B(OH)_3 + {}^{10}B(OH)_4^- \quad (II)$$

The stable isotope $^{11}B$ is enriched in $B(OH)_3$ compared to $B(OH)_4^-$, and the combination of equations (I) and (II) can be used to determine the distribution of the two boron species and the isotopic composition of each for a given pH. The boron isotopic composition in the ocean is relatively constant over this time period because the residence time of seawater boron is about 14 million years, and has an average seawater $\delta^{11}B$ value of 39.61‰. $B(OH)_3$ at low pH is dominant and therefore the $\delta^{11}B$ of $B(OH)_3$ is equal to the isotopic composition of the total dissolved boron in seawater (39.61‰). In contrast, the isotopic composition of $B(OH)_4^-$ is dominant in seawater and equal to the isotopic composition of the total dissolved boron at high pH. And, the $\delta^{11}B$ in $B(OH)_3$ is about 20‰ higher than that in $B(OH)_4^-$ at any pH at equilibrium based on a constant fractionation factor ($\alpha$). This boric acid-borate fractionation number was defined as $$\alpha \equiv \frac{\left(\frac{^{11}B}{^{10}B}\right)_{Boric\ acid}}{\left(\frac{^{11}B}{^{10}B}\right)_{Borate}},$$

and there are two groups of empirical and analytical values that were suggested in seawater: (1) $\alpha=1.0194$, a theoretical result of Kakihana and has been applied widely on paleo-reconstructions, and (2) $\alpha=1.0246$, which was empirically obtained from Klochko and is considered to better describe the distribution of the two boron species in nature. During crystal growth, marine carbonates will primarily incorporate $B(OH)_4^-$ into the carbonate structure so that biogenic carbonates, such as coral and foraminifera, have $\delta^{11}B$ values that will coevolve with ambient seawater pH and, therefore, can be used to reconstruct ancient seawater pH values. However, due to the biological adjustments to the environments, species-specific fractionation factors and transfer functions may be more appropriate than the α values described above.

A precise and accurate measuring technique is critical because modern ocean pH changes of between 0.1 to 0.5 pH units can occur, which translate into changes of $\delta^{11}B$ values of 1 to 4‰. Most aragonite skeletal structures have relatively low boron concentrations; hence an ideal analytical technique would allow small sample sizes (several ng or less) to be processed in order to produce highly resolved (annual to decadal) estimates of pH.

Four different methods have been employed to measure boron isotopes: (1) Secondary Ion Mass Spectrometry (SIMS), (2) Positive Ion Thermal Ionization Mass Spectrometry (PTIMS), (3) Negative Ion Thermal Ionic Mass Spectrometry (NTIMS), and (4) Multi-collector Inductively Coupled Plasma Mass Spectrometry (MC-ICPMS). SIMS is an in situ approach that is appropriate for small sample sizes appears to be the most promising technique for high-resolution temporal records of pH. However, seasonal or annual variation of $pCO_2$ in seawater will induce changes in seawater pH of 0.2 to 0.4 units or 1.5 to 3.5‰ $\delta^{11}B$ values of carbonates. Because the typical internal precision of SIMS is 1.2‰, this in situ analytical method may be more appropriate for longer time scale paleoclimate studies or time frames with large pH variations.

PTIMS ionizes the boron as $Cs_2BO_2$ that is formed by mixing a Cs-bearing solution with the samples in the preparation procedure, resulting in a stable beam for measurement with low boron isotope fractionation. The combination of stable beam and low fractionation results in an analytical precision on the order of ±0.2‰. The PTIMS method requires >250 ng of boron, purified to remove both alkali ions and organic material. Despite the large sample requirements, PTIMS has been used for coral studies; however, negative polarity thermal ionization is required for smaller samples. NTIMS ionizes the boron as the negative ion $BO_2^-$, and the presence of natural matrix salts (e.g. seawater and carbonate) can increase the ionization efficiency to up to two orders of magnitude higher than that by PTIMS. The higher ionization efficiency reduces the amount of sample required (~1 ng), but because instrumental mass fractionation occurs between the dominant $^{11}BO_2^-$ and $^{10}BO_2^-$ species, triplicate or more analyses are required for accurate, precise results. Therefore, the standard NTIMS approach requires 3 to 6 ng per sample. Foster et al. reported an improved method for small samples (<1 ng), Total Evaporation NTIMS (TE-NTIMS), which minimizes the instrumental mass fractionation and maximizes the sample signal by analyzing samples from beginning to exhaustion. Both NTIMS methods result in typical errors of <0.5‰.

Recently, boron isotopic ratios have also been measured by MC-ICPMS with precision comparable with that of PTIMS on sample sizes of 15 to 30 ng. One of the drawbacks to the MC-ICPMS method has been the long wash out time between samples required to eliminate residual boron in the sample introduction system (i.e. memory). In order to eliminate this memory effect these latest studies applied two methods: injection of ammonia gas and high efficiency nebulization (d-DIHEN). In either case, the sample size requirements are still too large to precisely or accurately (because of blank issues) measure samples <5 ng in size. Ni et al. explored a side-by-side comparison of MC-ICPMS and NTIMS techniques and determined that organic materials probably bias the boron isotopic results in NTIMS, which may explain the deviations in results between laboratories. Because boron isotope analysis by MC-ICPMS requires boron purification, and the organic materials may result in inaccurate boron measurements in TIMS, chemical treatments are required for both NTIMS and MC-ICPMS analysis.

Many methods have been reported for the purification of boron from aqueous samples, including solvent extraction, chelation, chromatographic separation, conversion into gaseous methyl borate or boron fluoride, and ion exchange/B-specific resin. The conventional method for purifying boron from the alkaline matrix ions and organic materials is ion-exchange column chemistry. B-specific resin, Amberlite IRA-743, is widely used to separate boron from the matrix materials. However, the blank increases as a result of the reagents used during the column procedure and isotopic fractionation may occur in the ion-exchange process. An alternative way to purify boron is the microsublimation technique, developed by Gaillardet et al., which separates boron without any isotope fractionation. Wang et al. modified the method and showed that, with small modifications to the sublimation processing, no reagents or ion-exchanges resins are required in the process. Thus, microsublimation is a promising method for purification for boron (blank sensitive) samples that are extremely small (of the order of several ng).

Here we report on a new approach that applies the microsublimation technique and TE-NTIMS measurement method to achieve highly precise and accurate boron isotopic analysis for small samples (boron<1 ng). We have developed a microsublimation method modified from Gaillardet et al. and Wang et al. in order to process more samples (up to 20 per hotplate) with excellent reproducibility.

EXPERIMENTAL PROCEDURES

Laboratory Conditions, Reagents, and Labware

All chemical separation and sample handling were performed under ISO 4 (class 10) laminar flow hoods within an ISO 7 (class 10,000) clean room of the Glaciochemistry and Isotope Geochemistry Laboratory in the Department of Earth & Environmental Sciences at the University of Michigan. The air supply to the clean room is purified by boron-free ultra-low-penetration air (ULPA) filters with polytetrafluoroethylene (PTFE) backing both in the clean and machine rooms. Ultra-pure reagents were used throughout the chemistry steps: reagents (HCl, $HNO_3$, HF, and $H_2O_2$) were either Fischer Scientific Optima or distilled in Savillex (Eden Prairie, Minn., USA) DST 1000 distillation units in order to maintain ultra-low blanks. Water was first purified using a Super-Q (SQ) Millipore system (EMD Millipore, Corp., Millerica, Mass., USA) at 18.2 MΩ and then distilled again before use. The reagent boron blanks were all less than 1 ppb, which was measured on a Varian (Palo Alto, Calif., USA) 820 MS plasma-source quadrupole mass spectrometer housed in the Element Measurement Facility at the State University of New York, Oswego (Oswego, N.Y., USA). With a maximum of 50 μL reagent used for each sample and 1 μL of sample loaded onto a filament, the blank introduced was lower than 1 pg for each measurement and was negligible.

Savillex perfluoroalkoxy (PFA) labware was cleaned in a three-step cleaning procedure: (1) submerged overnight in 7N distilled $HNO_3$ (2) submerged overnight in 6N distilled HCl, and (3) filled with distilled concentrated $HNO_3$ for 3 days; all steps performed at 90° C. Between steps labware beakers were triple rinsed with SQ water. After being cleaned, the labware was dried in a boron-free filtered air drying cabinet (ProPlastic Technology, Chandler, Ariz., USA).

Standards and Samples

A range of elemental standard solutions was used to evaluate the success of the sublimation and mass spectrometric techniques. Solution standards included certified boric acid standards NIST SRM 951a (NIST, Gaithersburg, Md., USA) (a replacement for NIST SRM 951), AE-121 (BAM, Berlin, Germany) and a west Mediterranean seawater standard, IAEA B-1 (IAEA, Vienna, Austria). In order to assess the long-term analytical precision, we processed a large Porites coral sample to be used as an in-house working standard for marine aragonite carbonate (UM-CP1). The coral was live-collected off the coast at Rodriguez Key, Fla., USA in 1990. The coral was treated with sodium hypochlorite after collection and a pristine segment (approximately 2 g) was powdered, rinsed three times with SQ water and dried at room temperature. For standard or seawater sample solutions, the samples were diluted to provide 750 ppb boron in 1.7 N HCl. The carbonate powders were dissolved in 1.7 N HCl to a concentration of 750 ppb.

Finally, we assessed the reproducibility of this technique by measuring a series of natural seawater samples from a bivalve culture experiment in the Gulf of Maine, USA. Natural seawater—seasonally varying in salinity, pH and temperature—was pumped into the Darling Marine Center (Walpole, Me., USA) from an average depth of 10 m. Samples were directly collected from the experimental tanks approximately biweekly (January 2010 to August 2010) and then were filtered through a 0.45 μm filter (Cameo™ 30 GN Nylon prefilter; GE Osmonics Inc., Minnetonka, Minn., USA) and refrigerated at ~4° C.

Because the Darling Marine Center pumps water in from the Damariscotta River, a tidewater estuary slightly inland from the central coastal of the Gulf of Maine, an additional seawater sample that was removed from the influences of the estuary was collected for comparison. The Gulf of Maine surface seawater sample was collected at 44°26'9.829"N, 67°26.0'18.045"W off Jonesport, Me. on Nov. 23, 2009. In order to assess possible factors that might affect the boron isotopic composition, it is useful to track the boron isotopic ratio in different sources (freshwater versus full marine conditions). The collection and measurement of boron isotopic composition in seawater from the culture tanks and the open ocean environment can be used to evaluate whether the culture experiments were representative of the natural marine environment.

Boron Separation by Microsublimation

Principles

The microsublimation technique for boron purification is based on the tendency of boron to sublimate at a temperature and pressure where alkaline matrices and organic matter remain in solution or solid form. The technique design utilized uses a 5 mL conic bottom Savillex PFA vial. The vial is set upside-down so that the cap can be heated, causing the boron to sublimate and then condense onto a cooler surface at the conical point in the bottom of the vial. In the experiments of Gaillardet et al., the flat bottom (the cap of the vial) was heated to 60-65° C. for 12 hours with aluminum foil wrapped on the lower part of the device. The drawback of this design lies in the difficulty of controlling and maintaining stable and consistent heating and cooling conditions, as non-reproducible heating and cooling conditions may result in variable sample recoveries. Furthermore, this sublimation process was conducted after conventional column chemistry techniques, which may cause isotopic fractionation. Wang et al. modified the above technique by performing a sublimation process, which included an additional fan for cooling but did not require prior resin use. Even with these modifications, inconsistent heating conditions may still occur between different vials, especially at the conical top of the vials. Therefore, we designed and fabricated microsublimation block sets to ensure that all samples were exposed to the same thermal conditions during this process.

Figure 1A:
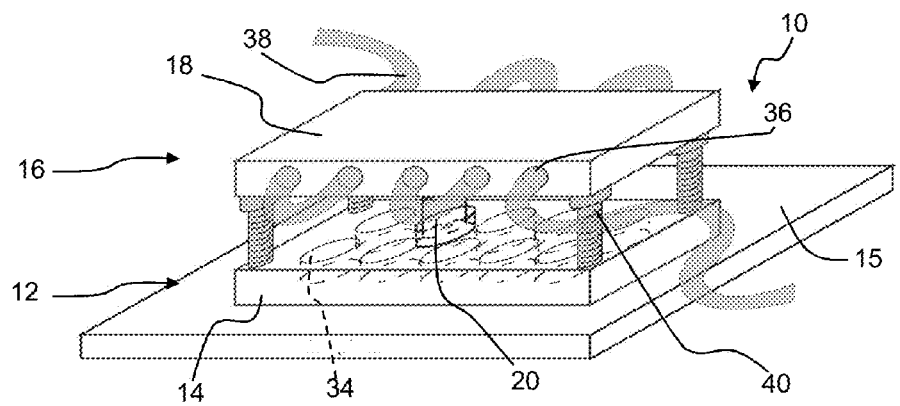
FIG. 1A is a schematic illustration of a microsublimation device according to the present teachings.
Figure 1B:
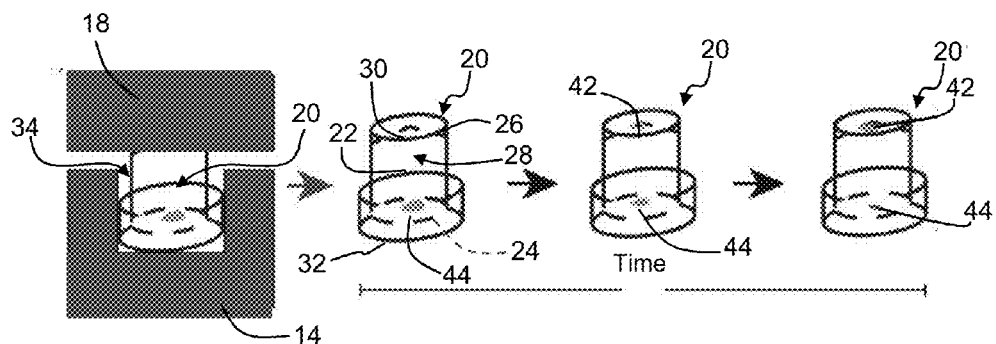
FIG. 1B is a schematic illustration showing uniform heating and cooling of a vial containing a sample, wherein samples are loaded onto a cap with a conic bottom vial in an upside-down position.
Figures 1C, 1D:
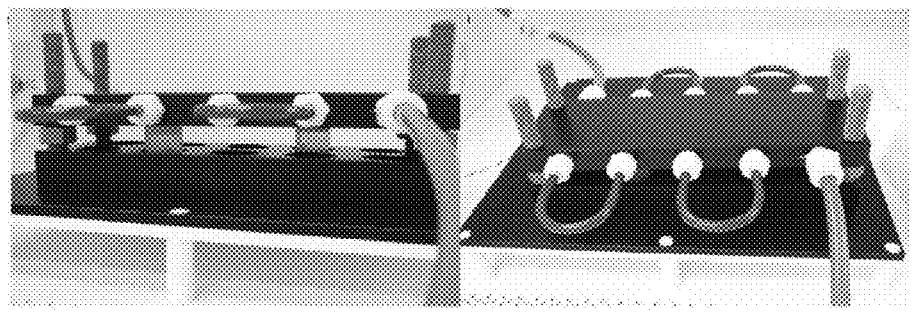
FIG. 1C and FIG. 1D are photographs of an exemplary microsublimation device.

An exemplary system device 10 for separating a component from a multicomponent composition or mixture is shown in FIGS. 1A and 1B. More particularly, device 10 can be used to separate any component from a multicomponent composition or mixture, wherein the component sublimates under different conditions, such as a different temperature and/or pressure, than the remaining components in the composition or mixture. In one embodiment, the device 10 is used to separate boron or boron isotopes from a composition comprising alkaline or carbonate components, organic matter, or a combination thereof wherein the composition is in a solid or liquid form.

The device 10 comprises a first half 12 having a heating section 14, such as a heating block that is adjacent to and in thermal contact with a source of heat 15, such as a hot plate, and a second half 16 having a cooling section 18. It should be understood, however, that in some embodiments, heating section 14 or cooling section 18 can be replaced or eliminated to provide an ambient temperature, so long as a sufficient temperature differential is achieved between first half 12 and second half 16 to promote sublimation of the targeted component. The second half 16 is opposite to and above the first half 12, such that the first half 12 is below the second half 16. In various embodiments, one or both of the heating section 14 or the cooling section 18 are made of stainless steel with a thermoplastic coating, which helps provide even and uniform heating or cooling surfaces.

The device 10 is configured to receive at least one vial 20, such that the at least one vial 20 is disposed between the first half 12 and the second half 16. The at least one vial 20 has an interior compartment 22 that extends from a first end 24 to an opposing closed second end 26. The interior compartment 22 has a conical portion 28 that defines a closed point 30 at the second end 26. The at least one vial 20 is composed of any suitable material known in the art, including perfluoroalkoxy alkane (PFA). The vial 20 is configured to be removeably coupled to a cap 32 by any means known in the art, such as, for example, by threading, by interference fit, or by a clasp. When coupled together with cap 32, the vial 20 can be either air-tight or it can be in communication with the exterior environment to a desired extent, depending on the conditions necessary to separate a component from a composition or mixture. The vials 20 are adapted to receive a multicomponent composition or mixture. In one embodiment, the vials 20 receive at least one isotope of boron in an alkaline or carbonate matrix, organic matter, or an alkaline or carbonate matrix including organic matter.

The at least one vial 20 is disposed between the first half 12 and the second half 16, such that the cap 32 is disposed adjacent to and in thermal contact with the first half 12 and the closed second end 26 is disposed adjacent to and in thermal contact with the cooling section 18. Accordingly, the first half 12 contains at least one feature 34 formed therein for closely and/or precisely receiving the cap 32 and optionally a portion of the first end 24 of the at least one vial 20 in thermal contact therewith. In various embodiments, the at least one feature 34 is a plurality of slots or bores machined into the heating section 14, which provides a uniform heating surface. The device 10 can include a plurality of features 34, such as from 2 to 30 features 34. However, the device 10 can be scaled up such that it comprises greater than 30 features for closely receiving the caps 32 of a plurality of vials 20. In some embodiments, the second half 16 also comprises at least one corresponding feature formed in cooling section 18 for closely receiving the second end 26 of the at least one vial 20 in thermal contact therewith. In some embodiments, the cooling section 18 of the second half includes a water jacket cooling system that has at least one channel 36 adapted to receive tubing 38 for flowing water, such as cool or chilled water or other cooling liquid, about the cooling section 18 to provide a uniform cooling surface. Because the cap 32 is received by the first half 12, which is below the second half 16, the at least one vial 20 coupled to the cap 32 is in an upside-down configuration.

In some embodiments, the device 10 also comprises at least one adjustable column 40 disposed between the first half 12 and the second half 16 for defining a spacing distance therebetween. For example, the at least one column 40 can be raised or lowered to position the cooling section 18 relative to the at least one vial 20. In some embodiments, the at least one column 40 is composed of or comprises a thermoplastic that has excellent corrosion resistance properties at high temperature and ensures that no vibration from water flow disturbs drops of condensate that form at the point 30 of the conical portion 28 of the at least one vial 20. In some embodiments, the thermoplastic also has a low thermal conductivity to prevent heat transfer to the cooling section 18, is corrosion resistant, and can withstand temperatures up to at least about 90° C. In one embodiment, the thermoplastic is chlorinated polyvinyl chloride (CPVC).

With particular reference to FIG. 1B, the device 10 is configured to separate a component 42 from a multicomponent composition or mixture 44. The at least one vial 20 is adapted to receive the multicomponent composition or mixture 44. The multicomponent composition 44 can be transferred to an inner surface of the cap 32 and the vial 20 is then coupled to the cap 32. The first half 12 provides a uniform heating surface and the second half 16 provides a uniform cooling surface, such that when a plurality of vials 20 are disposed between the first half 12 and the second half 16, each vial 20 is exposed to the same thermal conditions and/or gradient. Accordingly, during heating of the first half 12 and cooling of the second half 16, the component 42 is sublimated and condensed on the closed end 30 of the at least one vial 20. This process occurs over a period of time, such as, for example, about 12 hours. However, the time may be adjusted depending on the size of the multicomponent mixture or composition 44. In one embodiment, the multicomponent composition or mixture 44 is selected from the group consisting of an alkaline matrix, a carbonate matrix, organic matter, or a combination thereof and the component 42 is boron or at least one boron isotope or comprises boron or at least one boron isotope.

The present teachings also provides a method of separating a component from a multicomponent mixture or composition. The method, for example, can be performed with the device 10 shown in FIGS. 1A-1D. In various embodiments, the method is useful for separating boron or at least one boron isotope from a multicomponent composition or mixture including an alkaline matrix, carbonate matrix, organic matter, or a combination thereof.

In some embodiments, the method includes transferring a multicomponent composition onto an interior surface of a cap and coupling a first end of a vial to the cap. Coupling the first end of the vial to the cap may include pressing the vial into the cap, such as with an interference fit, screwing the vial into the cap, such as with threading, or resting the vial on the cap. The vial has an interior compartment that extends from the first end to an opposing second end. In some embodiments, the interior compartment has a conical portion that defines a closed point at the second end. By keeping the cap below the vial, the resulting closed vial is in an upside down configuration.

In some embodiments, the method then includes positioning the vial relative to a separation device comprising a first half defining a first temperature and a second opposing half defining a second temperature, such that the cap is in thermal contact with the first half and the second end of the vial is in thermal contact with the second half. The second temperature being sufficiently cooler than the first temperature to promote sublimation of the component. More particularly, in some embodiments, the first half includes a source of heat, such as a hot plate, and the heating section is adjacent to and in thermal contact with the source of heat to provide a uniform heating surface. In some embodiments, the cooling section includes a water jacket cooling system that has at least one channel adapted to receive tubing for flowing water, such as cool or chilled water, or other cooling liquid about the cooling section to provide a uniform cooling surface. Because the first half is positioned below the first half, positioning the cap on the heating section of the first half requires keeping the closed vial in the upside-down configuration. In various embodiments, positioning the vial relative to the separation device includes positioning the vial relative to a feature of the first half formed therein for closely and/or precisely receiving at least the cap of the vial. The feature, for example, can be a slot. In some embodiments, the second half includes a corresponding feature, such as a corresponding slot, for receiving the second end of the vial. It is understood that the devices may comprise a plurality of features to simultaneously receive a plurality of vials, such that the plurality of vials are subject to the same thermal conditions throughout the method.

In various embodiments, positioning the vial relative to the separation device includes positioning the vial relative to the feature on the first half, and bringing the second half into a desired position relative to the vial and to the first half by adjusting columns, such as CPVC columns, disposed between the first and second halves. Adjusting the columns defines a spacing distance between the first and second halves. In one embodiment, adjusting the columns includes adjusting the columns such that the second half is moved straight down such that features of the second half receive the second end of the vial.

After positioning the vial relative to the first and second halves, the method includes activating the heating section to provide heat to the multicomponent composition and/or activating the cooling section to cool the second end of the vial to achieve the desired or necessary temperature gradient. In various embodiments, activating the heating section includes activating the source of heat to generate heat with a temperature of from about 60° C. to about 80° C., or from about 70° C. to about 74° C. and activating the cooling section includes passing water with a temperature of from about 10° C. to about 25° C., or from about 15° C. to about 20° C., through the cooling section. In various embodiments, the water or cooling liquid has a temperature of about 20° C., about 21° C., about 22° C., about 23° C., about 24° C., or about 25° C. After activating the heating and cooling sections, the method includes sublimating the component from the multicomponent composition or mixture to generate a gas and condensing the gaseous component at the point of the vial to generate an isolated component. In various embodiments, the isolated component is in a liquid or solid phase. If in a solid phase, the component may be reconstituted in a liquid prior to further analyzing the component. Accordingly, the method may also include analyzing the component by mass spectrometry to determine an isotopic ratio for the component, as described further herein.

In this study, samples were dissolved and diluted to a concentration of about 750 ppb in 1.7 N HCl. An aliquot of about 20 μL was weighed and about 30 μL of standard SRM 951a was added to evaluate the boron concentration using the standard addition technique. Another 50 μL sample solution droplet was loaded on the cap of a 5 mL conic bottom PFA vial (Savillex). The vial was then closed firmly and placed conic-bottom-side up in machined sublimation blocks and a cooling block placed on top (see FIGS. 1A-1D, especially FIGS. 1C and 1D). The heating and cooling blocks are coated in a thermoplastic material. The bottom heating blocks were machined to precisely fit the tops of the 5 mL conic beakers. Water from the in-house deionized chilled water system flows through the upper part of cooling coil block through machined channels connected by polyvinyl chloride (PVC) tubing so that the temperature can be maintained at about 23° C. The cooling coil block rests on threaded chlorinated polyvinyl chloride (CPVC, a thermoplastic that has excellent corrosion resistance at high temperature), such that no vibration from water flow disturbs the drops. In addition to supporting the cooling block, the low thermal conductivity CPVC prevents heat transfer to the upper cooling block, is corrosion resistant, and can withstand temperatures up to 90° C. The coated stainless steel design of our heating blocks provides a uniform heating and cooling surfaces for the sublimation, which facilitates complete boron evaporation (FIG. 1B). In order to process large numbers of samples, we designed the heating and cooling blocks to process 10 separate samples at a time and up to 20 per hotplate.

Once sample vials were loaded into the vials and placed on the microsublimation blocks, they are heated at 70 to 74° C. for 12 hours. The sublimate boron sample was then split in half and one part was used to test the yield using standard addition while the other half of the solution was used for isotopic analysis by TE-TIMS. To confirm the ability of our method to purify boron without organic interferences or isotopic fractionation, two additional steps were tested: $H_2O_2$ treatment and 20 hour sublimation time.

Assessment of Organic Removal: Comparison with $H_2O_2$

In order to assess the performance of the microsublimation blocks in separating the organic matter from the boron sample solution, the in-house standard UM-CP1 and standard seawater IAEA B-1 were processed with and without hydrogen peroxide treatment prior to sublimation. For the hydrogen peroxide test, 30% $H_2O_2$ and concentrated HCl were added to dissolve (carbonate) or dilute (seawater) samples to 750 ppb in 1.7 N HCl and 10% $H_2O_2$ and the samples were then placed in an ultrasonic bath for two hours in closed vials. The samples then were uncapped and allowed to decompose and exsolve $O_2$ for one hour before being loaded onto the caps. Two sublimation periods, 12 and 20 hours, were also tested to assess the quantitative sublimation of boron from an organic rich matrix (e.g. Wang et al.).

Quantitative Recovery of Boron

A standard addition method was used to quantify the recovery of the microsublimation method. SRM 951a was added to two sets of standards (UM-CP1 and IAEA B-1) before and after sublimation for each set. The samples were weighed before and after standard addition and microsublimation for concentration calculations. The sample concentrations before and after sublimation can therefore be calculated from the equations based on two end-member mixing model:

$$[B]_{before} = \frac{[B]_{SRM951a} \times W_{SRM951a} \times \left[\left(\frac{^{11}B}{^{10}B}\right)_{measured} - \left(\frac{^{11}B}{^{10}B}\right)_{SRM951a}\right]}{W_{sample} \times \left[\left(\frac{^{11}B}{^{10}B}\right)_{sample} - \left(\frac{^{11}B}{^{10}B}\right)_{measured}\right]}$$

$$[B]_{after} = \frac{[B]_{SRM951a} \times W_{SRM951a} \times \left[\left(\frac{^{11}B}{^{10}B}\right)_{measured} - \left(\frac{^{11}B}{^{10}B}\right)_{SRM951a}\right]}{\frac{50}{47} \times W_{sample'} \times \left[\left(\frac{^{11}B}{^{10}B}\right)_{sample} - \left(\frac{^{11}B}{^{10}B}\right)_{measured}\right]}$$

The $[B]_{before}$ is the boron concentration with standard added before sublimation, $[B]_{after}$ is the boron concentration with standard added after sublimation. The boron concentration prepared for SRM 951a was 722 ppb in this study. $W_{SRM\,951a}$, $W_{sample}$ and $W_{sample'}$ are the weight of SRM 951a, the original sample solution and sublimated sample solution, respectively. The $^{11}B/^{10}B$ ratios are boron isotopic ratios for SRM 951a, the target sample and the mixture solution measured in this study. The 50/45 factor in the calculation for boron concentration after microsublimation results from the removal of alkaline matrix and organic matter residual, which changed the post-sublimation solution mass.

Mass Spectrometry, Measurement by TE-TIMS

All measurements were conducted on a TRITON Plus™ multicollector thermal ionization mass spectrometer (Thermo Electron Corp., San Jose, Calif., USA) operating in negative mode at the Department of Earth and Environmental Sciences, University of Michigan. Daily gain calibrations were conducted to minimize instrumental uncertainty. A cold trap with liquid nitrogen was used to sustain the main high vacuum source pressure (HV source pressure) between $4 \times 10^{-8}$ to $8 \times 10^{-8}$ mbar, which improved the stability of the environment and reduced possible interferences from water vapor and $CO_2$ in the sample chamber. Venting of the mass spectrometer with ultra-high purity nitrogen gas and baking of the source between turret exchanges were also implemented to reduce interferences and pump down time.

Samples were loaded onto outgassed single Re filament at 0.8 A current. First 1 μL boron-free synthetic seawater matrix was first loaded and dried to facilitate ionization efficiency. The synthetic seawater was made based on the method developed by Kester et al. A total evaporation method was employed in order to decrease variability in isotopic measurements caused by different mass fractionation behavior of sample types and load sizes. This technique also reduces the sample size, so that 1 μL of sample solution (<1 ng boron) was loaded onto the filament following the matrix. The samples were dried down at 2 A current for 15 seconds and the filaments were flashed to a dull red color in the center of the filament (about 2.5 A). The loaded samples were then immediately placed into the source chamber, maintained at low humidity with ultra-pure nitrogen gas during sample turret changes.

Figure 2:
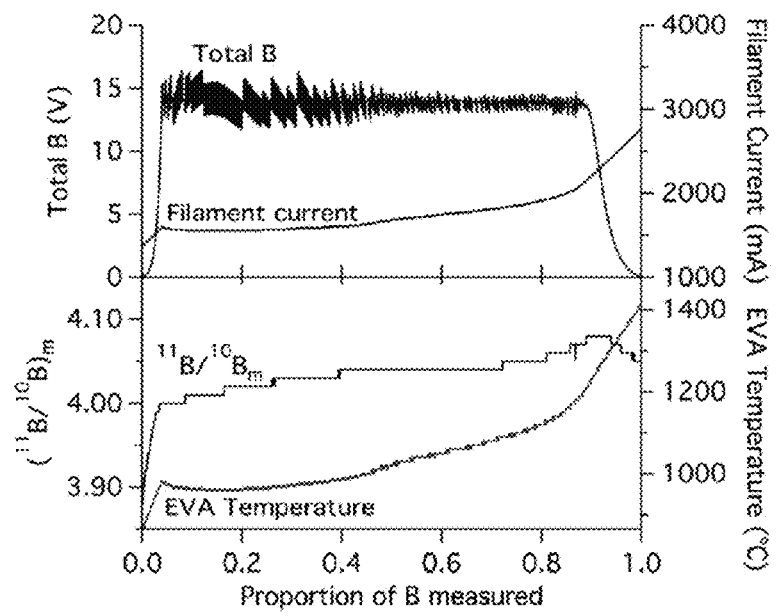
FIG. 2 shows example ionization curves of measured boron isotopic ratio, total boron intensity, filament current and filament temperature for SRM 951A by Total Evaporation-Negative Ion Thermal Ionic Mass Spectrometry (TE-NTIMS)

Samples were preheated to 1200 mA at a rate of 100 mA/min while 600 cycles of (about 10 minutes) baseline were measured. The sample was then gradually heated to 1300 mA at a rate slower than 30 mA/min. The $^{35}$Cl signal was detected when the filament reached ~800° C. because of its lower ionization energy and was used for initial source lenses tuning when it increased to about 100 mV. To assess the organic interference on mass 42 ($^{12}$C$^{14}$N$^{16}$O) mass 26 ($^{12}$C$^{14}$N) was also monitored with a secondary electron multiplier (SEM) at the beginning of the heating process because organic matter tends to ionize at a lower temperature than boron. The control masses were then switched to 42 ($^{10}$B$^{16}$O$^{16}$O$^-$) and 43 ($^{11}$B$^{16}$O$^{16}$O$^-$) after initial tuning of the source lenses. The sample was gradually heated (10-20 mA per heating cycle) and the source lenses were optimized between cycles. When the intensity of mass 43 reached 60-70 mV, peak centering was conducted for masses 42 and 43. The total evaporation data acquisition was started when the intensity of mass 42 reached 20 mV (~830-890° C.) and the collection was terminated when the signal dropped lower than the initial 20 mV intensity. Typical curves for SRM 951a measurement are illustrated in FIG. 2. The detailed cup configuration and method settings are listed in Table 1. The heating slope was 10 mA/cycle in our method, which we found allows us to achieve maximum intensity of the signal and maintain stability rather than exceed detection limits due to sudden sample exhaustion. To eliminate the interferences from different oxygen isotopic compositions when forming BO$_2^-$, mass 45 ($^{11}$B$^{16}$O$^{18}$O$^-$) was measured. The ratio of mass 45 to 43 was used to calculate the oxygen fractionation factor based on the exponential law for mass dependent fractionation, which follows the equations:

$$\left(\frac{O_{18}}{O_{16}}\right)_m = \left(\frac{O_{18}}{O_{16}}\right)_n \times \left(\frac{17.9992}{15.9949}\right)^\beta \text{ and } \left(\frac{O_{17}}{O_{16}}\right)_m = \left(\frac{O_{17}}{O_{16}}\right)_n \times \left(\frac{16.9991}{15.9949}\right)^\beta,$$

in which the subscripts m and n represent the measured isotopic ratio and the ratio of isotope abundances in nature, respectively. The β value is the fractionation factor for the measurement. Therefore, by knowing the $$\left(\frac{O_{18}}{O_{16}}\right)_m$$

ratio (determined from the ratio of mass 45 to 43), we can obtain a filament-specific $^{17}$O/$^{16}$O ratio and then subtract the number to correct 43/42 ($^{11}$B/$^{10}$B) ratios.

TABLE 1

Detailed cup configuration and method settings

| Faraday cup | Species | Other Settings |
|---|---|---|
| C | 42 | Maximum pilot signal: 14 mV |
| H1 | 43 | Heat slope: 10 mA/cycle |
| H2 | — | Intensity offset for stop: 0 |
| H3 | 45 | Integration time: 8.389 s |

All the boron isotopic ratios were normalized to NIST SRM 951a standard with δ notation as:

$$\delta^{11}B = \left[\frac{\left(\frac{^{11}B}{^{10}B}\right)_{sample}}{\left(\frac{^{11}B}{^{10}B}\right)_{SRM\,951a}} - 1\right] \times 1000(\text{‰}).$$

RESULTS

All of the mean values from this study are consistent with the certified or other published values. Slightly higher averages were obtained compared to published results using conventional NTIMS techniques.

Figure 3:
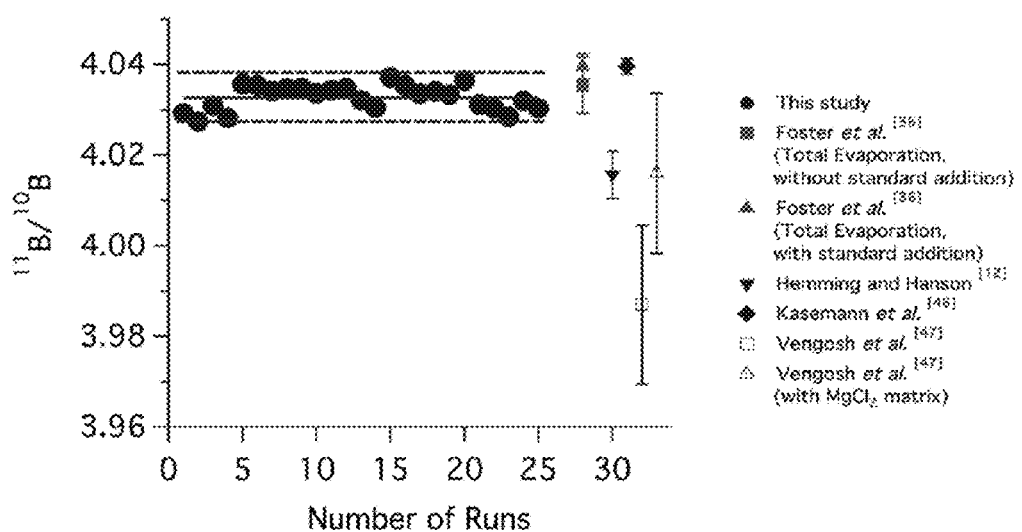
FIG. 3 shows results of $^{11}B/^{10}B$ ratio of SRM 951a, wherein solid horizontal lines represent mean values for different data sets, with two standard deviations shown in dashed horizontal lines, and wherein data analyzed by an NTIMS method from previous studies are listed for comparison.
Figure 4A:
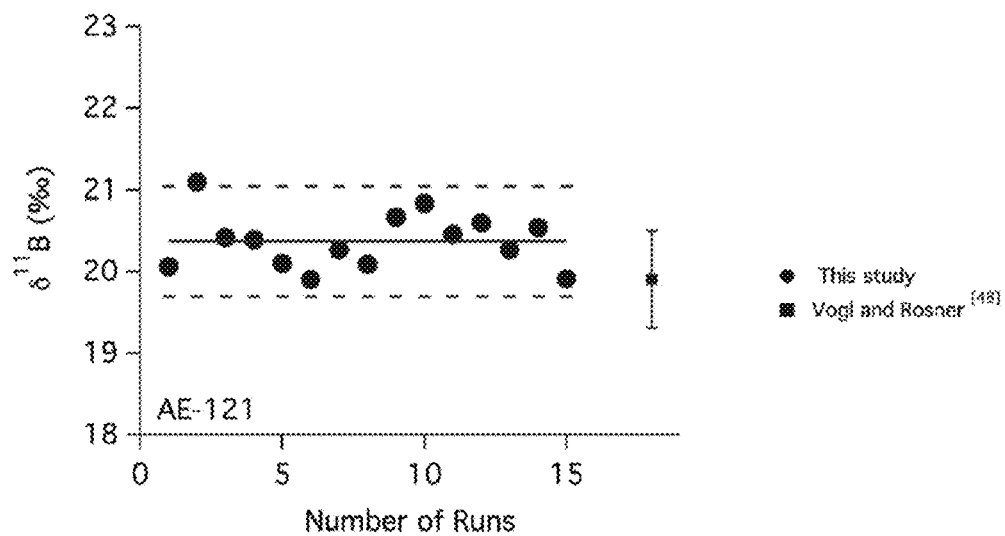
FIG. 4A shows $\delta^{11}B$ results for an AE-121 standard, wherein solid horizontal lines represent mean values for different data sets with two standard deviations shown in dashed horizontal lines, and wherein data analyzed by an NTIMS method from previous studies are listed for comparison.
Figure 4B:
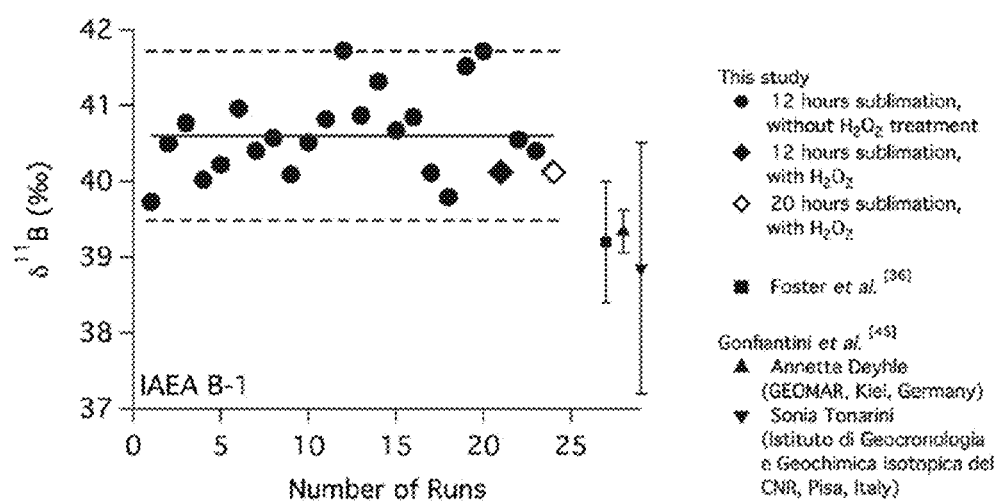
FIG. 4B shows $\delta^{11}B$ results for an IAEA B-1 standard, wherein solid horizontal lines represent mean values for different data sets with two standard deviations shown in dashed horizontal lines, and wherein data analyzed by an NTIMS method from previous studies are listed for comparison.

The results of boron isotope standards NIST SRM 951a, AE-121, IAEA B-1 and an in-house working standard UM-CP1 are shown in FIGS. 3-5. Boron isotopic ratios for the inter-laboratory standards SRM 951a, AE-121 and IAEA B-1 reported by other studies are plotted in FIGS. 3, 4A and 4B for comparison. No organic signal was detected after sublimation. A total of 25 SRM 951a samples were measured over 3 months, and the ratio of $^{11}$B/$^{10}$B$_{SRM\,951a}$ is 4.0328±0.0054 (1.35‰, 2 STD, n=25). The mean δ$^{11}$B values of AE-121 and IAEA B-1 are 20.37±0.68‰ (2 STD, n=15) and 40.60±1.12‰ (2 STD, n=24), respectively. For the internal standard UM-CP1, the δ$^{11}$B value was 19.08±1.17‰ (2 STD, n=14).

For the analysis of UM-CP1, the samples were cross-tested both with and without hydrogen peroxide treatment and sublimated for 12 or 20 hours. The same testing was also carried out for the IAEA B-1 seawater standard, which as indicated in the last four data points in FIG. 4B. These results agree well (with a similar reproducibility to other boron isotopic standards as shown above), regardless whether they were processed with H$_2$O$_2$ or had a longer sublimation time.

The calculated concentrations before microsublimation and after microsublimation are 1154 ppb and 1106 ppb for UM-CP1 and 619 ppb and 633 ppb for IAEA B-1.

The δ$^{11}$B values of seawater from the culture experiment in the Gulf of Maine are shown in FIG. 6. The mean δ$^{11}$B value was 39.31±1.73‰ (2 STD, n=36).

Discussion

Accuracy

Mass 26 was monitored in the beginning of every measurement and no signal (<2 counts per second (cps)) was detected, confirming the success of microsublimation for purification from organic materials. The reported boron isotopic ratios measured by TIMS for SRM 951a fall within a range of 3.98 to 4.04. Our results are similar and consistent with the data from Foster et al., measured using the TE-NTIMS method. This indicates that our analysis can provide externally reproducible boron measurements from extremely small samples. Offsets appeared between our $^{11}$B/$^{10}$B ratios with other non-TE-NTIMS data, which might be attributed to the laboratory-specific instrumental fractionation. These differences should not affect the δ$^{11}$B value between laboratories because all the boron isotopic ratios were normalized to SRM 951a. Based on the results reported here for the two external standards, AE-121 and IAEA B-1, and after comparing these results with those published using both TIMS and MC-ICPMS techniques, we conclude that accurate and reproducible δ$^{11}$B measurements were achieved in this study.

Assessment of Microsublimation Technique: Organic Removal and Recovery

The results of $H_2O_2$ sample treatment with 12 and 20 hours are shown in FIG. 5 and the last 4 data points in FIG. 4B. The treatment with $H_2O_2$ oxidizes organic matter adhering to carbonate skeletons such that it has been widely used to eliminate the interferences from organic matter. There is no trend or systematic offset between samples with different sublimation time or treatment with $H_2O_2$, indicating that our microsublimation is highly suitable to recover boron for isotopic analysis. Based on these experiments, a rapid throughput of 10 to 20 samples was achievable using a 12-hour sublimation period for 50 μL sample solutions in 5 mL conic bottom vials.

The boron concentrations of UM-CP1 and IAEA B-1 before and after sublimation are consistent with each other, with standard deviations of 3% and 1.5%, respectively, and yields are better than 97%. The equivalent solution concentrations before and after our microsublimation process indicate the success of the purification design and the reliability of our data. For UM-CP1, the differences between the calculated solution concentration of ~750 ppb and the concentration of ~1100 ppb obtained by standard addition is due to a higher boron concentration in the powder than our initial assumption of 40 ppm. The actual boron concentration in the coral Porites powder UM-CP1 is about 65 ppm, measured by Varian 820 MS plasma-source quadrupole mass spectrometer.

Reproducibility

The combination of the warm block on the bottom and the water-cooled coil at the top provides reproducible sample processing for analysis by mass spectrometry. For a variety of standards including boric acid, seawater and coral, a precision better than 1.4‰ (2 STD, n>10) was achieved. This precision is comparable with previous TE-NTIMS measurements by Foster et al. and Ni et al. in which precisions of 1.5‰ for SRM 951 and 0.8‰ for IAEA B-1, and 1.2‰ for their in-house foraminifera standard were reported, respectively. Although the precision of our method is slightly worse than that of MC-ICPMS and P-TIMS, the sample amount required for single measurement is lower than 1 ng, which provides the potential to construct high-resolution pH records during modern times, including the Industrial Revolution, and over longer geologic timescales.

Boron Isotopic Composition of Seawater for Culture Experiments

The preliminary results of boron isotopic composition in tank seawater from the culture experiment in the Gulf of Maine ($\delta^{11}B=39.31‰$) is about 1.3‰ lower than the isotopic ratio in IAEA B-1 ($\delta^{11}B=40.60‰$) and for the open ocean sample from the Gulf of Maine ($\delta^{11}B=40.49‰$). Since riverine flux is considered as an important input to balance global marine boron isotope budget, this offset may be attributed to the influence of river water in the Gulf of Maine with a lower boron isotopic compositions. Because the absolute boron isotopic compositions in biogenic carbonate depend on not only the pH in seawater, but also the $\delta^{11}B$ value in water from which it precipitates, it is important to have seawater $\delta^{11}B$ constraints in order verify the boron isotopic composition for culture experiments. In addition, other isotopic composition such as $^{87}Sr/^{86}Sr$ may be needed to clarify the water sources influencing the marine environment.

Conclusions

In this study, we developed a rapid and high throughput microsublimation method to purify boron from alkaline matrices and organic matter. The advantage of our method is that it provides a consistent, steady heating and cooling environment for large quantity of samples. Several tests have confirmed the viability of our technique, including comparisons of results from additional $H_2O_2$ treatment and applying the microsublimation method alone, different sublimation times, and quantitative recovery tests using standard addition (e.g. Foster et al.). Based on these assessments, our microsublimation technique provides a low-blank method for quantitative recovery and separation of boron from both major elements and organic matter. No further resins or $H_2O_2$ treatment are required. Coupling the new microsublimation technique with the TE-NTIMS method, a reproducibility better than 1.4‰ (2 STD, n>10) was achieved for a variety of standards with a wide range of boron isotopic ratios, including boric acid standards SRM 951a and AE-121, seawater standard IAEA B-1, and an in house coral standard UM-CP1. Furthermore, a sample size <1 ng is required for each measurement, which is sufficient for reconstructing high-resolution geological records. The preliminary test on natural seawater also showed comparable precision with measurements on standards, confirming the applicability of our high-precision boron isotopic analysis by TE-NTIMS.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A device for separating boron from carbonate, said device comprising:
    a first half defining a first temperature;
    a second half defining a second temperature, said second half being opposite said first half, said second temperature being less than said first temperature to define a temperature gradient sufficient to sublimate the boron from the carbonate;
    a plurality of vials disposed between said first half and said second half, a closed end of each of said plurality of vials being disposed adjacent and in thermal contact with said second half;
    said plurality of vials being adapted to receive boron and an alkaline matrix or organic matter therein such that as a result of said temperature gradient, boron is sublimated and condensed on said closed end of each of said plurality of vials.

2. The device according to claim 1, wherein said first half and said second half each contains a plurality of features formed therein for closely receiving each of said plurality of vials in thermal contact therewith.

3. The device according to claim 1, wherein said second half comprises a water jacket cooling system to achieve said second temperature.

4. The device according to claim 1, wherein said first half comprises a heating plate to achieve said second temperature.

5. The device according to claim 1, further comprising:
    adjustable columns disposed between said first half and said second half for defining a spacing distance therebetween.

6. The device according to claim 4, wherein said adjustable columns thermally isolate said first half from said second half.

7. The device according to claim 1, wherein said plurality of vials each have an interior with a conical portion that defines a point at the closed end.

8. The device according to claim 7, wherein said boron is condensed on said point of each of said plurality of vials.

9. The device according to claim 1, wherein said plurality of vials are each composed of a perfluoroalkoxy alkane (PFA).

10. A device for separating a component from a multi-component composition; the device comprising:
- a first half having a heating section;
- a second half having a cooling section, said second half being opposite said first half; and
- at least one vial having an interior compartment that extends from a first end to an opposing second end, said first end being removeably coupled to a cap, said interior compartment having a conical portion that defines a closed point at said second end, said at least one vial being disposed between said first half and said second half such that said cap is in thermal contact with said first half and said second end is in thermal contact with said second half;
- wherein said at least one vial is adapted to receive a multicomponent composition such that during heating of said first half and cooling of said second half, a component is sublimated and condensed at said point of said at least one vial.

11. The device according to claim 10, wherein said first half is below said second half.

12. The device according to claim 10, wherein said cooling section comprises a channel adapted to receive tubing for flowing coolant about said cooling section to provide a uniform cooling surface.

13. The device according to claim 10, further comprising adjustable columns disposed between said first half and said second half for defining a spacing distance therebetween, wherein said adjustable columns are made of chlorinated polyvinyl chloride (CPVC).

14. The device according to claim 10, wherein said first half includes at least one slot adapted to precisely receive said cap of said at least one vial.

15. The device according to claim 10, wherein at least a portion of said first half and at least a portion of said second half are coated with a thermoplastic.

16. The device according to claim 10, wherein said first half provides a uniform heating surface and said second half provides a uniform cooling surface such that when more than one vial is disposed between said first half and said second half, each vial is exposed to the same thermal conditions.

17. The device according to claim 10, wherein the component is boron.

* * * * *